(12) United States Patent
Sakamoto et al.

(10) Patent No.: US 7,775,556 B2
(45) Date of Patent: Aug. 17, 2010

(54) FRAME STRUCTURE FOR WORKING VEHICLE

(75) Inventors: Kunihiko Sakamoto, Chikugo (JP);
Kouichi Takata, Chikugo (JP);
Nagahiro Ogata, Chikugo (JP);
Yousuke Yamashita, Chikugo (JP);
Makiko Tajima, Chikugo (JP)

(73) Assignee: Yanmar Co., Ltd., Osaka (JP)

( * ) Notice: Subject to any disclaimer, the term of this patent is extended or adjusted under 35 U.S.C. 154(b) by 356 days.

(21) Appl. No.: 11/908,747

(22) PCT Filed: Jan. 23, 2006

(86) PCT No.: PCT/JP2006/300950

§ 371 (c)(1),
(2), (4) Date: Nov. 1, 2007

(87) PCT Pub. No.: WO2006/098084

PCT Pub. Date: Sep. 21, 2006

(65) Prior Publication Data

US 2009/0230731 A1 Sep. 17, 2009

(30) Foreign Application Priority Data

Mar. 14, 2005 (JP) .............................. 2005-072108

(51) Int. Cl.
*B62D 49/00* (2006.01)

(52) U.S. Cl. .................. 280/781; 180/311; 180/312; 414/686

(58) Field of Classification Search ................. 180/311; 280/781, 791; 414/349, 373, 686
See application file for complete search history.

(56) References Cited

U.S. PATENT DOCUMENTS

| 2,345,351 | A | * | 3/1944 | Maxon et al. | ............... | 180/53.1 |
| 4,182,456 | A | * | 1/1980 | Paul | ........................... | 414/685 |
| 4,514,007 | A | * | 4/1985 | Macht | ........................ | 180/311 |

(Continued)

FOREIGN PATENT DOCUMENTS

JP  61-3780  1/1986

(Continued)

OTHER PUBLICATIONS

International Search Report mailed on Apr. 25, 2006 for International Application No. PCT/JP2006/300950 filed on Jan. 23, 2006, 3 pgs.

*Primary Examiner*—Ruth Ilan
*Assistant Examiner*—James English
(74) *Attorney, Agent, or Firm*—Sterne, Kessler, Goldstein & Fox P.L.L.C.

(57) ABSTRACT

Production of a working vehicle frame consumes high costs because it requires high rigidity. A simple construction improves the rigidity of the frame and reduces costs required for the production. In a structure of a frame (9) for a working vehicle (1), side sections of the frame (9) are constructed in a boat form, and, in a front view, the width of a lower section of the frame (9) is set smaller than that of the central section in the vertical direction of the frame (9). Further, a mast plate (63) for supporting a front loader (2) and a front axle installation plate section (75) are integrated, and side frames (62) constructing the side section of the frame (9) and the mast plate (63) are jointed in a lateral T shape in a side view.

5 Claims, 19 Drawing Sheets

U.S. PATENT DOCUMENTS

| | | | | |
|---|---|---|---|---|
| 4,583,761 | A * | 4/1986 | Nagel et al. | 280/781 |
| 6,089,343 | A * | 7/2000 | Brewer | 180/311 |
| 6,167,980 | B1 * | 1/2001 | Anderson et al. | 180/311 |
| 7,338,080 | B2 * | 3/2008 | Urase et al. | 280/781 |
| 2002/0139601 | A1 * | 10/2002 | Nagatsuka | 180/312 |
| 2006/0001250 | A1 * | 1/2006 | Fukazawa et al. | 280/781 |
| 2009/0025989 | A1 * | 1/2009 | Takaku et al. | 180/65.1 |
| 2009/0200785 | A1 * | 8/2009 | Weibling et al. | 280/781 |
| 2009/0211833 | A1 * | 8/2009 | Lee et al. | 180/311 |

FOREIGN PATENT DOCUMENTS

| | | |
|---|---|---|
| JP | 06-173297 | 6/1994 |
| JP | 09-316927 | 12/1997 |
| JP | 2004-001769 | 1/2004 |

* cited by examiner (a)

(b)

FRAME STRUCTURE FOR WORKING VEHICLE

BACKGROUND OF THE INVENTION

1. Technical Field

The present invention relates to a frame structure for a working vehicle. More particularly, the present invention relates to a simple and low-cost frame structure that is lightweight and has high rigidity.

2. Background Art

A combination of angle pipes and steel I-beams is known for a frame structure for a working vehicle (for example, see the Japanese Patent Laid Open Gazette No. 2004-1769).

BRIEF SUMMARY OF THE INVENTION

Problem to Be Solved by the Invention

Generally, it is difficult to work with a frame that consists of the combination of angle pipes and steel I-beams. Further, the assembly of such frames is labor intensive. An object of the present invention is to improve the rigidity of the frame and to reduce costs required for production by a simple construction.

Solution

The present invention provides a frame structure for a working vehicle, comprising: a side frame having a boat form in a side view; and a front frame attached to the side frame. In the frame structure, a mast plate member, serving as a part of a mast for supporting a front loader, and a front axle support member for supporting a front axle are integrally constructed in the front frame.

Preferably, the mast plate member is disposed to overlap the side frame, and is fixed to the side frame.

Preferably, a mast is constructed by means of fixing the mast plate member to a mast member for supporting a front loader, the mast member is provided at a back face thereof with a partition plate, and a piping for a working machine is passed through an opening of the partition plate into the mast.

Preferably, left and right sets of the side frame and the front frame attached to the side frame are provided in parallel, and a front plate is provided between front edges of the front frames so that the front plate and the left and right sets of side and front frames are constructed in U-shaped in a top view, a front axle installation plate is fixed to the front axle support member and two plates extended in the longitudinal direction from the upper portion of the front axle installation plate are attached to the front plate, and a box-shaped arrangement is constructed by the two plates and the front axle installation plate.

Preferably, left and right sets of the side frame and the front frame attached to the side frame are provided in parallel, and the distance between a lower edge of the left set of side and front frames and a lower edge of the right set of side and front frames is narrower than that between a vertical central portion of the left set of side and front frames and a vertical central portion of the right set of side and front frames.

A method of connecting the mast plate and the side frames in the present invention is plug-welding by providing a hole at the overlapping section of the mast plate and the side frames. Thus, piping in a chassis can be passed without a decrease of strength.

In the frame structure, a plate for connecting the frame at a bottom face of a mast section projects outside the frame, and a tank installed in the working vehicle is hung therefrom, so that the tank capacity can be enlarged.

Said two plates also work as a stopper against oscillating of the front axle. In the frame, a hole for tie-down is provided at a front plate connecting front edges of the frames, so that the number of parts can be reduced and the working vehicle is fixed strongly at a low cost.

EFFECTS OF THE INVENTION

According to the present invention, the number of parts constructing the frame of the vehicle can be reduced, and a contact area of the side frame and the mast plate member attached to the front frame can be enlarged, whereby the rigidity of the joint section of the side frame and the mast plate member can be improved.

According to the present invention, required parts can be reinforced effectively.

According to the present invention, by a simple construction, space saving and protection of the piping can be achieved.

According to the present invention, the rigidity of a front section of the chassis can be improved, and load given to a loader connected to the mast etc. can be smoothly transmitted.

According to the present invention, the rigidity of the working vehicle can be secured, and at the same time, the interference with steering wheels can be prevented.

DETAILED DESCRIPTION OF THE INVENTION

The present invention provides a frame structure for a working vehicle by means of combining bent plates.

First Embodiment

A working vehicle as a mode for carrying out the invention will be described below.

Figure 1:
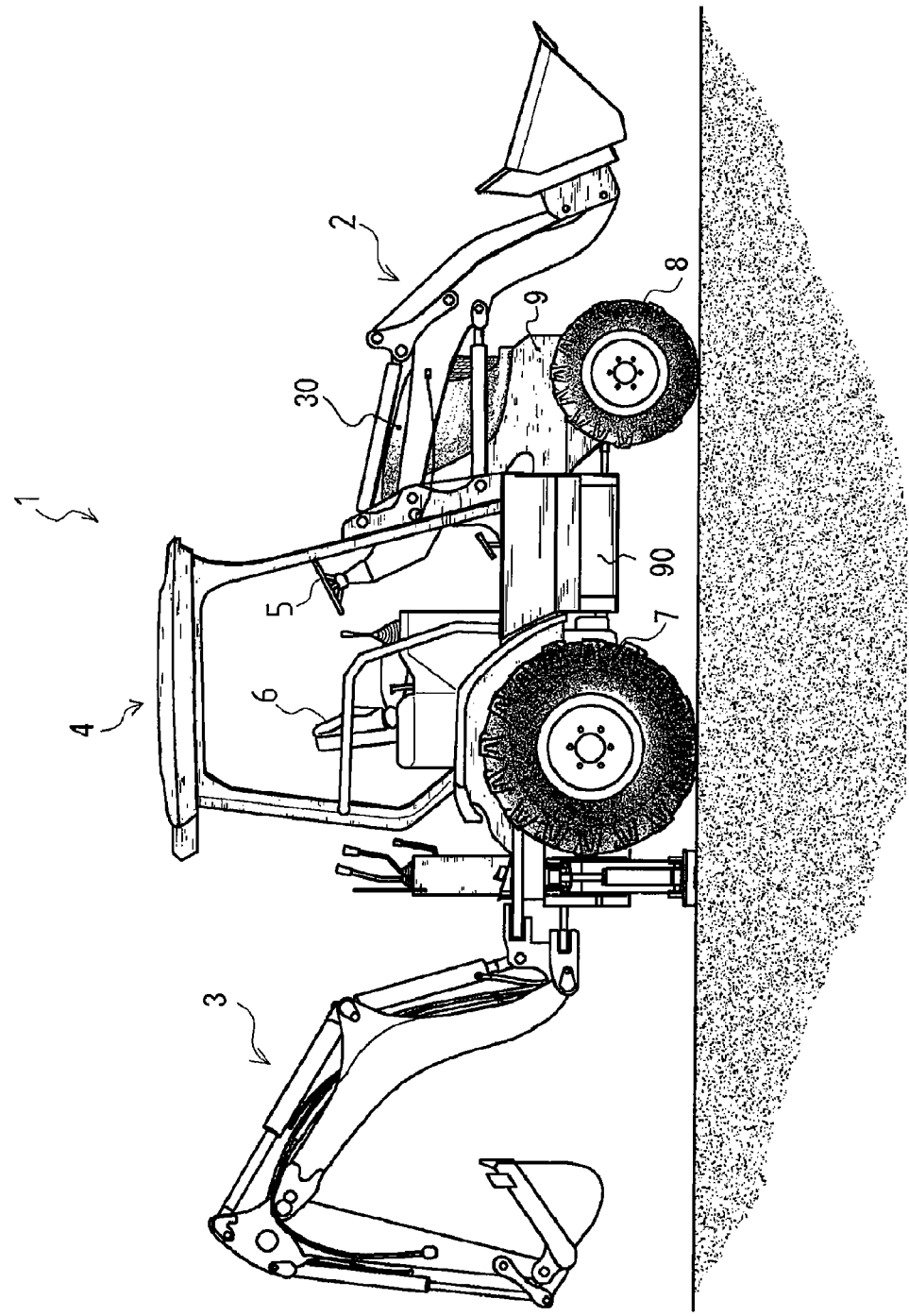
FIG. 1 is a side view of a working vehicle.

FIG. 1 is a side view of a working vehicle.

A working vehicle 1 shown in FIG. 1 is a tractor loader backhoe, equipped with a loader 2 and a digger apparatus 3. An operation part 4 is provided at a center portion of the vehicle 1, and the loader 2 is provided in front of the operation part 4, and the digger apparatus 3 is provided in a rear of the operation part 4. Front wheels 7 and rear wheels 8 are equipped with the vehicle 1, so as to enable driving of the vehicle 1 with the loader 2 and the digger apparatus 3.

A steering wheel 5 and a seat 6 are provided in the operation part 4, and an operation apparatus for driving direction and an operation apparatus for the loader 2 are provided at the side of the seat 6. Thus, a driving direction of the vehicle 1 and the loader 2 can be operated at the operation part 4. The loader 2 that is one of the loading devices is connected beside the vehicle 1 and extended forward, and a bucket is provided at a head of the loader. An engine is provided at a front portion of a frame 9 that is a chassis of the vehicle 1, and the engine is covered in a bonnet 30 provided on the frame 9. The loader 2 is provided outside of the bonnet 30.

The digger apparatus 3 is detachably attached to a rear portion of the vehicle 1, and the digger apparatus 3 is operated by an operation apparatus provided in a rear of the seat 6.

A hydraulic oil tank 90 is provided beside the operation part 4, which works as steps for getting on and off the operation part 4. The step formed on a fuel tank is provided at the opposite side to the operation part 4.

Next, a frame structure of the working vehicle will be described below.

Figure 2:
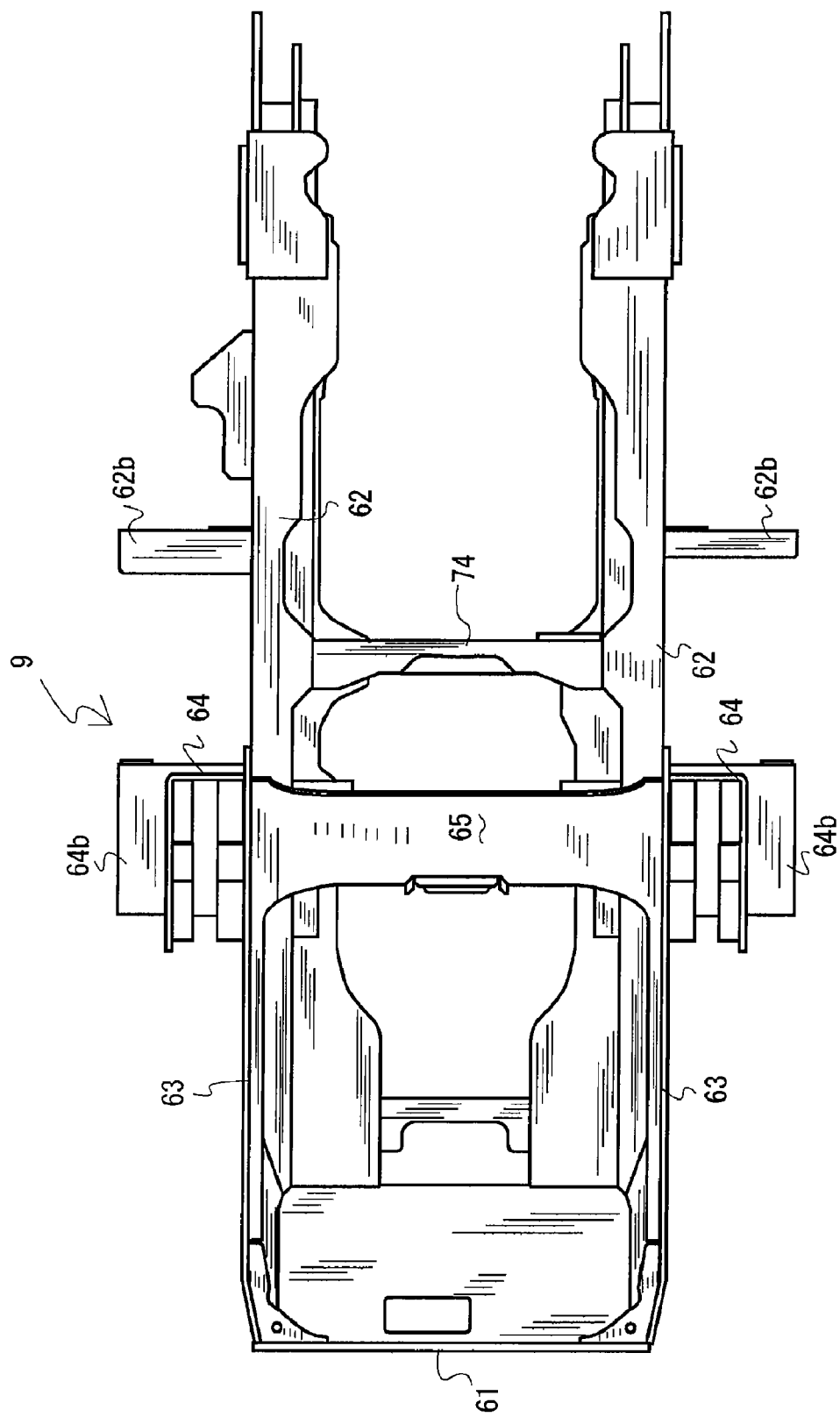
FIG. 2 is a top view of a frame structure of a working vehicle.

FIG. 2 is a top view of a frame structure of the working vehicle.

Figure 3:
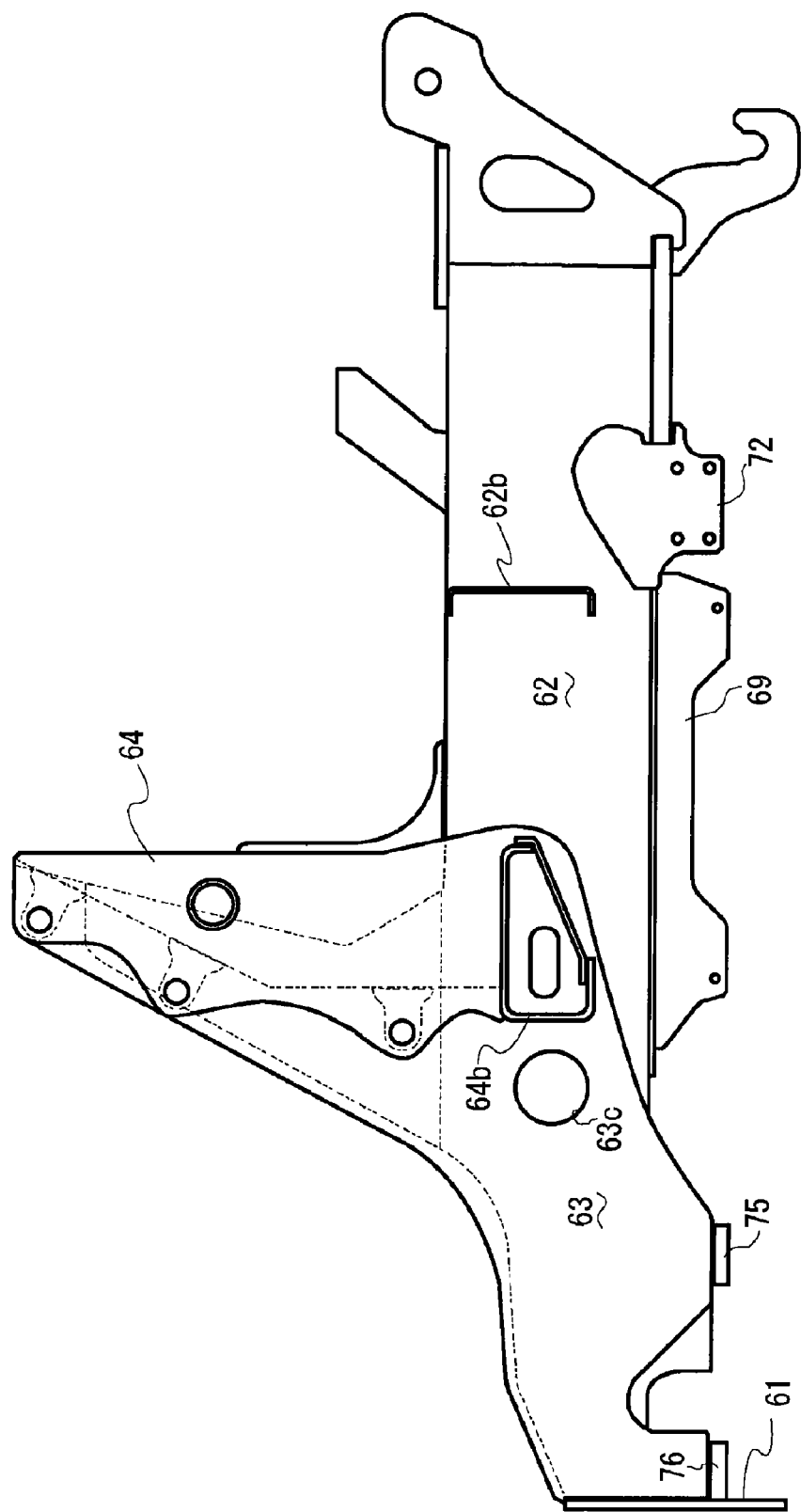
FIG. 3 is a side view of the frame structure of the working vehicle.

FIG. 3 is a side view of the frame structure of the working vehicle.

Figure 4:
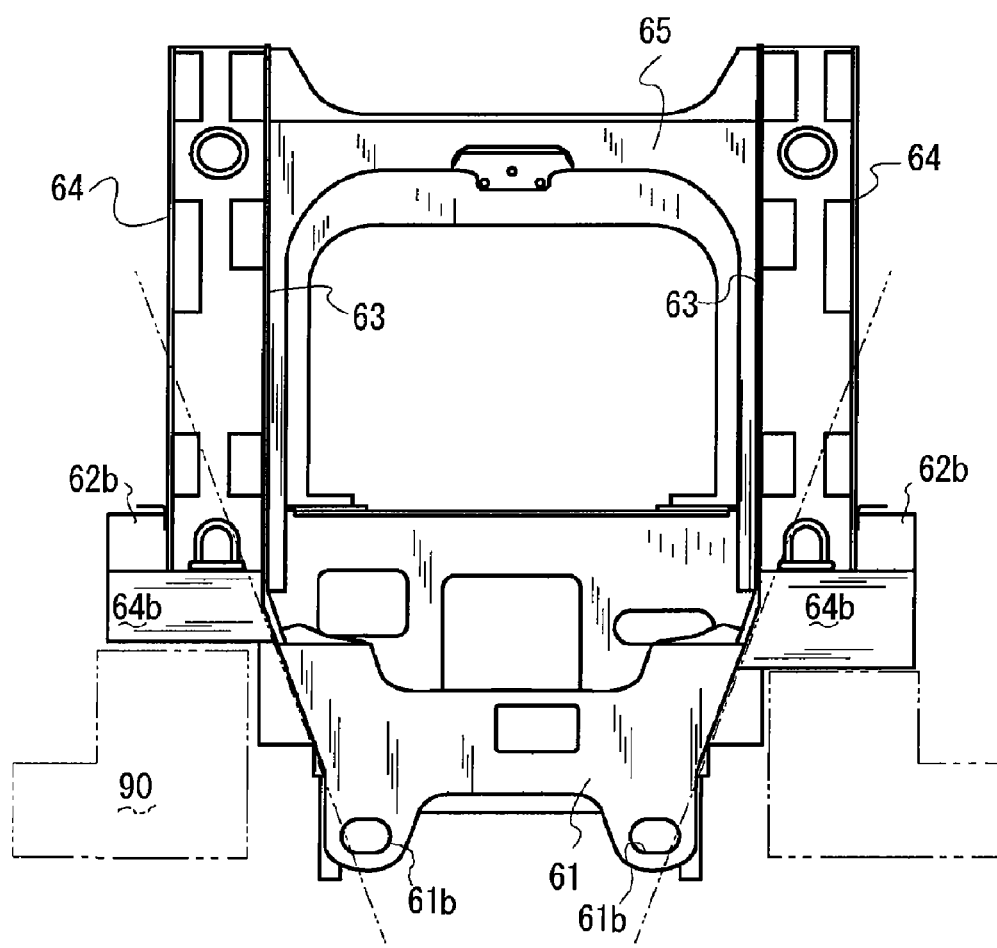
FIG. 4 is a front view of the frame structure of the working vehicle.

FIG. 4 is a front view of the frame structure of the working vehicle.

Figure 5:
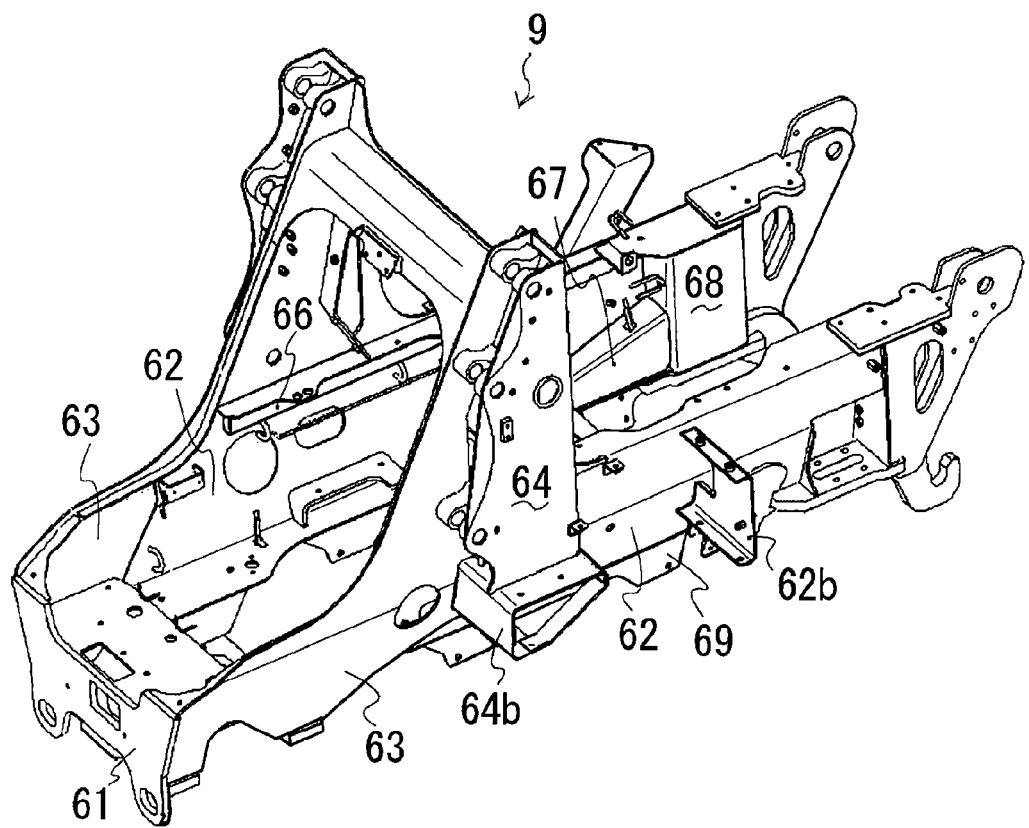
FIG. 5 is a perspective view of the frame structure of the working vehicle seen from the upper front.

FIG. 5 is a perspective view of the frame structure of the working vehicle seen from the upper front.

Figure 6:
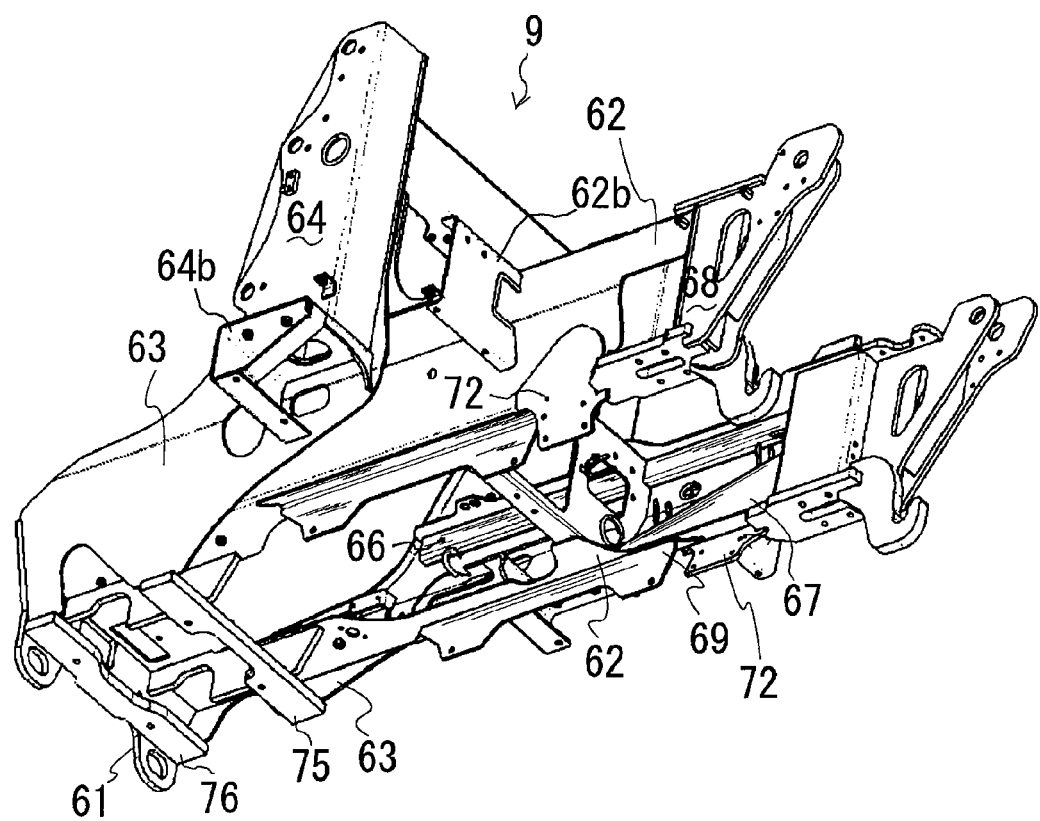
FIG. 6 is a perspective view of the frame structure of the working vehicle seen from the lower back.

FIG. 6 is a perspective view of the frame structure of the working vehicle seen from the lower back.

The frame 9 for the working vehicle mainly comprises two side frames 62 which are extended in the longitudinal direction and provided parallel to each other, two front frames 63 which are respectively connected to front portions of the side frames 62, and a front plate 61 which connects front portions of the front frames 63 to each other. A mast member 64 is constructed on an outer face of each of the front frames 63, and a rib 65 connects between the front frames 63.

A partition 74 working as a connection member is provided between the side frames 62, thereby providing the frame 9 as a rudder structure. The partition 74 is a cross member provided at a substantially center portion of the frame 9 so as to divide a space between the side frames 62 into an engine arrangement part and a transmission arrangement part.

In the side frame 62, a beam 62b is extended outward. The beam 62b is extended in the transversal direction, so that the beam 62b is substantially right-angled to the side frame 62. The section form of the beam 62b is a C-shaped form, thereby supporting a base member of the operation part 4.

The front frame 63 is extended backwardly upward slantwise from the front lower portion of the frame 9. The front frame 63 is extended upward from the connection section thereof connected to the side frame 62, and the mast member 64 is attached to the part of the front frame 63 extended upward. The engine and the bonnet 30 are provided between the front frames 63. Lift units of the loader 2 are connected to the mast member 64, which support the loader 2.

A lower mast portion 64b, which is a lower portion of the mast member 64, is configured as a member projected to the side. The lower mast portion 64b is configured as a member whose side form is L-like characters pushed down horizontally, thereby receiving the vertical force applied to the mast member 64. With respect to the frame 9, which is a chassis of the working vehicle, the lower mast portion 64b is extended outward, thereby connecting a base of the mast and a side face of the frame. Namely, the lower mast portion 64b is connected to the base of the mast member 64 and to the outer face of the front frame 63.

In the working vehicle 1, a fuel tank and a hydraulic oil tank 90 are hung on the lower mast portion 64b and the beam 62b. The fuel tank and the hydraulic oil tank 90 are respectively connected and supported onto the sides of the lower mast portion 64b and the beam 62b that are provided at the same side in the working vehicle. Thus, the support structure of the fuel tank and the hydraulic oil tank 90 can be simple and the number of parts can be decreased. Another tank having a different capacity can be easily attached there only if the tank has a similar upper portion to be connected. Furthermore, the frame with high rigidity can be used to support the tanks. The tanks are attached to the base of the lower mast portion 64b which constructs the base of the mast connected to the lift units of the loader 2, so that the space below the projection of the mast can be used effectively and the working vehicle can be constituted compactly.

The front plate 61 connects the front portion of the front frames 63 and constructs a front face of the frame 9 which is a chassis of the working vehicle. Two holes 61b for tie-down are provided at lower portions of the front plates 61. A rope for fixation or the like is attached to the hole 61b in carrying the working vehicle 1. The front plate 61 whose left and right sides are provided with the holes 61b is durable enough against the tie-down of the vehicle 1 using the holes 61b. The holes 61b are extended in the longitudinal direction, so that the rope passed through the hole 61b rarely twists. It is unnecessary for making the tie-down holes to have an additional member welded to the front plate 61, so that no projection is constructed on the front plate 61 and a front appearance of the working vehicle is improved.

A notch is provided at the central upper part of the front plate 61, whereby a hold mechanism of the bonnet 30 can be easily attached to the notch.

The front plate 61 is formed at side portions thereof along the side form of the front frame 63, and formed so that as it goes downward, the front plate 61 becomes narrow in the lateral width.

A frame structure will be described below in detail.

Figure 7:
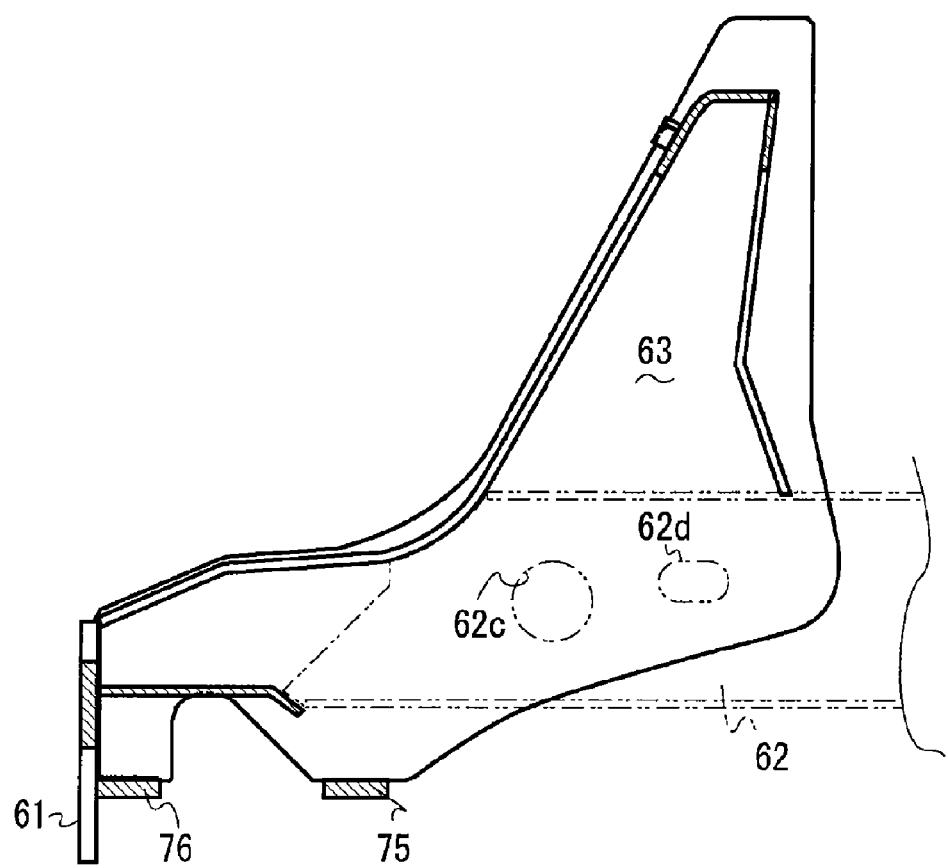
FIG. 7 is a side view partly in section of a connection structure of a front frame and a side frame.

FIG. 7 is a side view partly in section of a connection structure of a front frame and a side frame.

Figure 8:
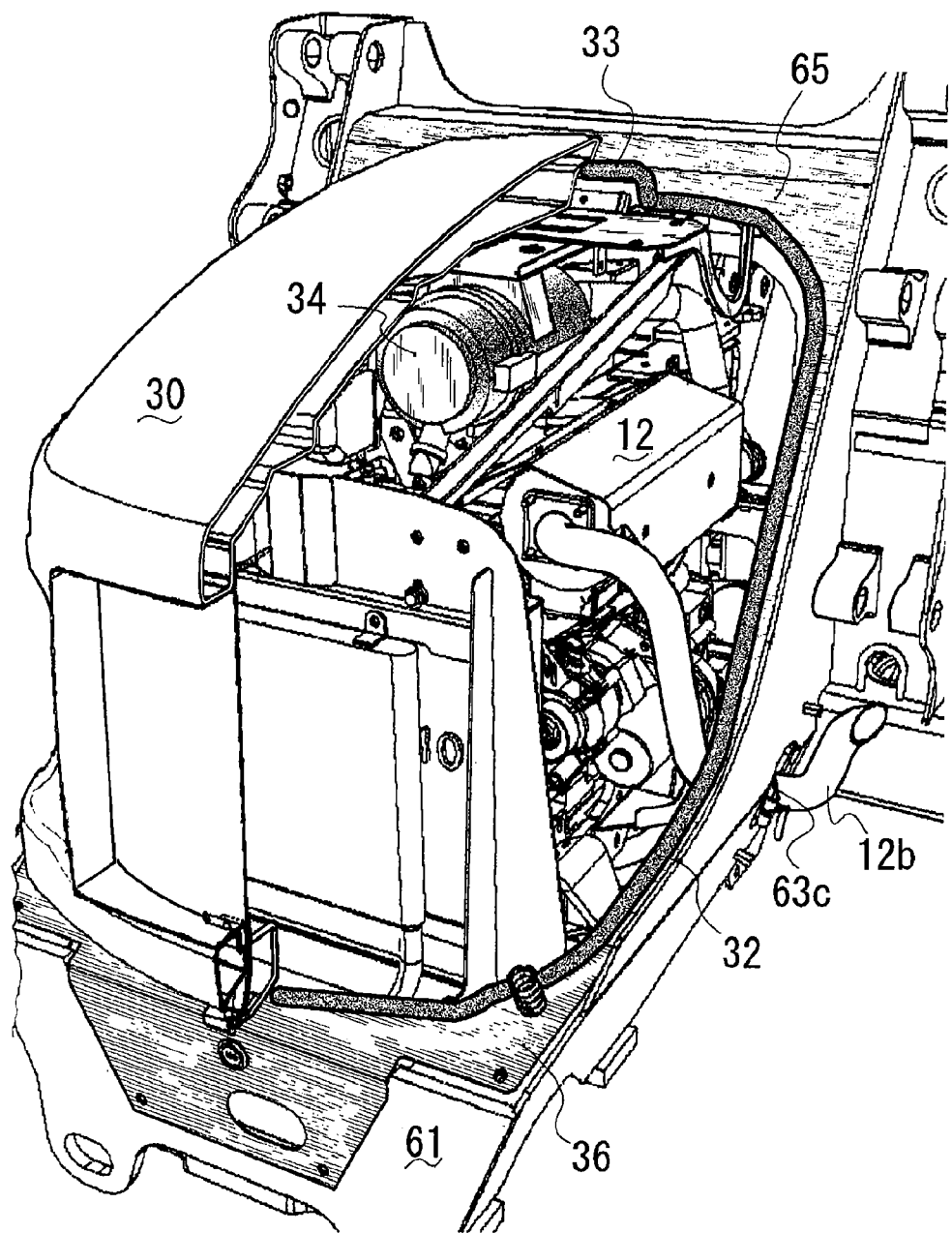
FIG. 8 is a perspective view partly in section of a structure of a front part of the working vehicle.

FIG. 8 is a perspective view partly in section of a structure of a front part of the working vehicle.

Figure 9:
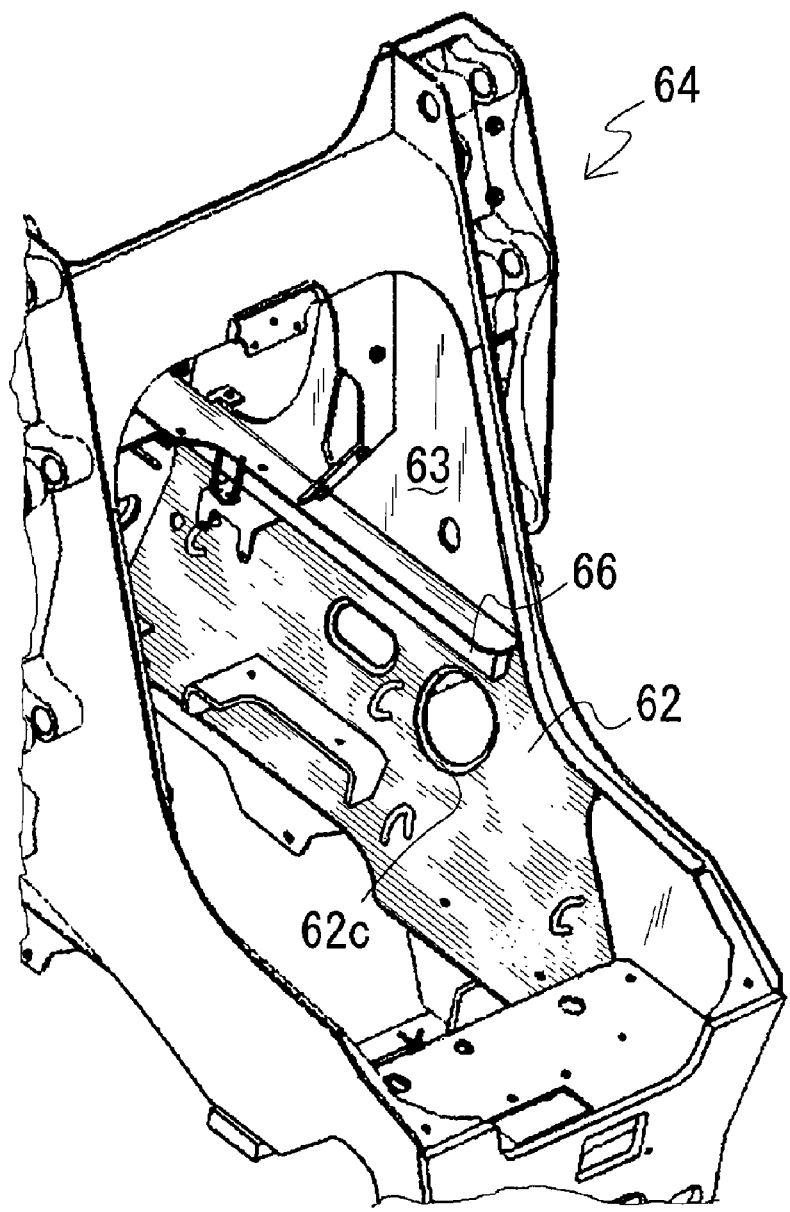
FIG. 9 is a perspective view of a structure of a left front part of the frame.

FIG. 9 is a perspective view of a structure of a left front part of the frame.

Figure 10:
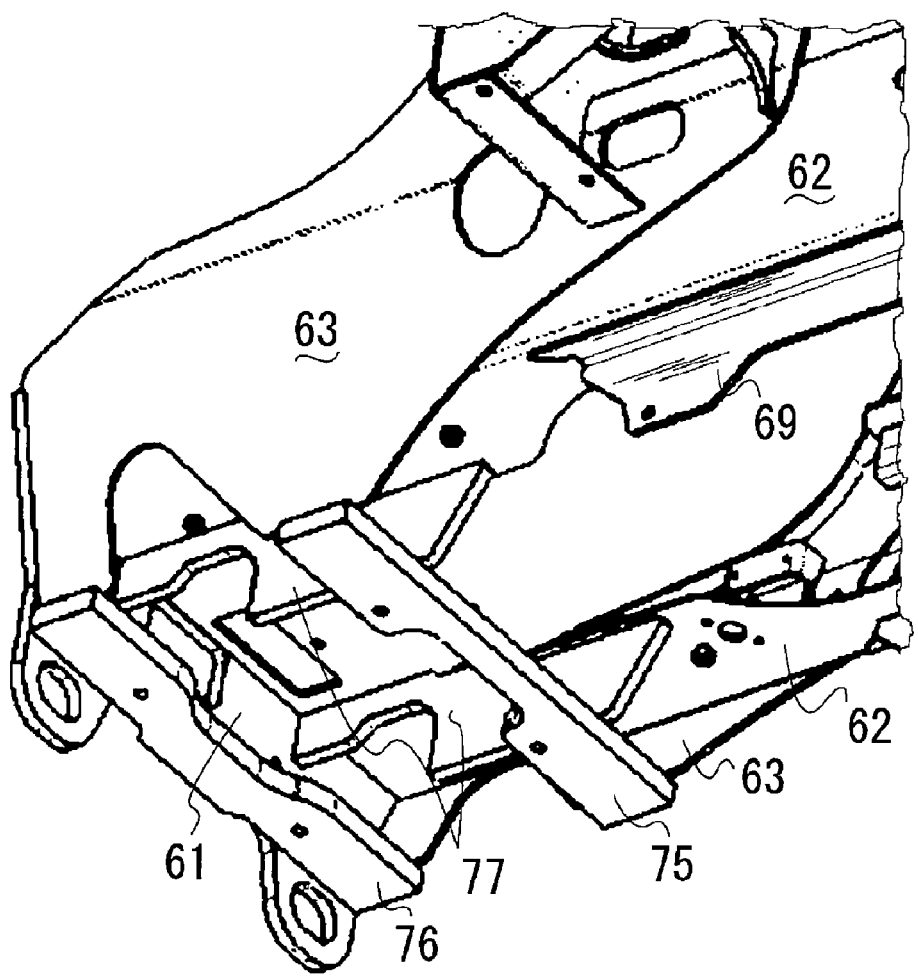
FIG. 10 is a perspective view of a structure of front lower part of the frame.

FIG. 10 is a perspective view of a structure of front lower part of the frame.

Figure 11:
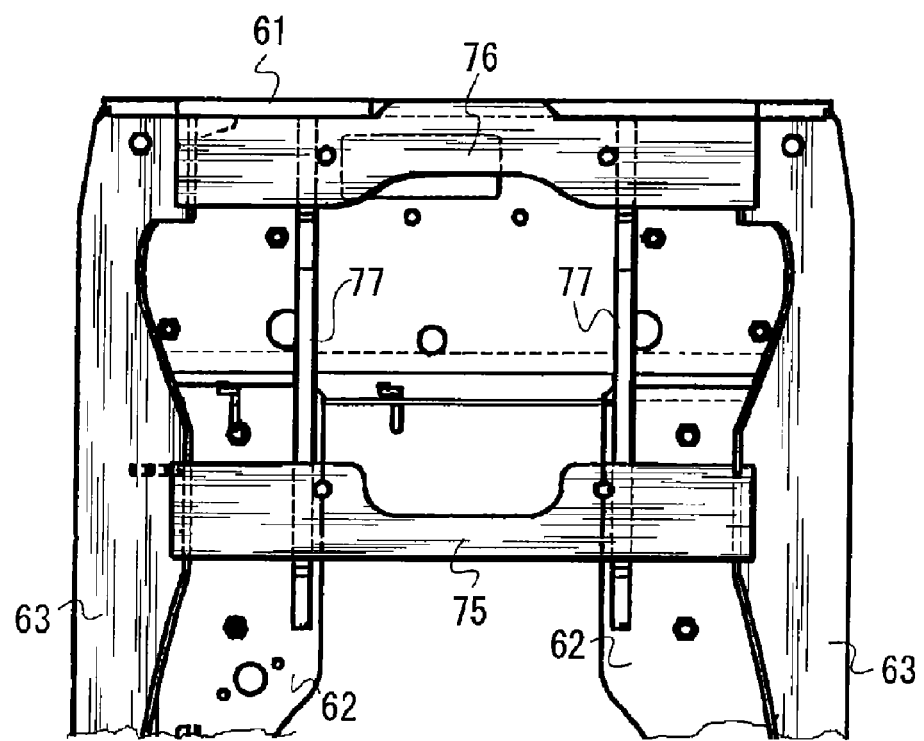
FIG. 11 is a bottom view of the structure of front lower part of the frame.

FIG. 11 is a bottom view of the structure of front lower part of the frame.

The frame 9, which is a chassis of the working vehicle 1, is mainly constructed as a joint of a flat plate and a bent plate. The frame 9 is reinforced at several parts, so that the frame of the working vehicle can be produced easily and at low cost. The bent plate can be easily constructed by bending, so that the working vehicle can be processed easily and produced at low cost in comparison with the case where the I-steels are used.

The lower portion of the frame 9 is formed to be boat-shaped so that when seen from the front, the narrower the frame 9 becomes when viewing the frame 9 from top to bottom along a vertical plane. Namely, each of both sides of the lower portion of the frame 9 inclines inward. The frame 9 is constructed as above mentioned, so that the space around the front wheels 8 can be sufficiency taken and the steerable angle of the front wheels 8 can be widely taken.

With respect to the frame 9, the lower portion of the side frame 62 is bent inside, and the upper and lower ends are horizontally bent inside. As the side frame 62 is bent inside, the effective area of the side frame 62 can be increased in section when viewed in the longitudinal direction, whereby the rigidity of the side frame 62 can be improved. Thus, improving the rigidity of the frame and, at the same time, preventing interference of the frame with the steerable wheels can be achieved.

The lower portion of the front frame 63 is also bent inside, similar to the side frame 62. The inner side of the front frame 63 is jointed to the outer side of the side frame 62, which constructs the front part of the frame 9. The front frame 63 is connected at a rear upper portion thereof to the mast member 64, and connected at a front lower portion thereof to attachment plates 75 and 76 (see FIGS. 10 and 11) provided laterally on a front axle. The upper surface of the attachment plate 75 is connected with two plates 77, which are extended longitudinally in parallel. The upper surfaces of the plates 77 are connected with the respective side frames 62, the lower surfaces of the plates 77 are connected with the attachment plate 75, and the front surfaces of the plates 77 are connected with the front plate 61. The plates 77 are provided between the front frames 63.

The attachment plate 75 is connected with the plates 77 and the front frames 63, and the plate 76 is connected with the front plate 61 and the front frames 63, thereby improving the rigidity of the front lower part of the frame 9 to which the front axle can be attached. In the front lower portion of the frame 9, the plates 77, and the attachment plates 75 and 76 are assembled into a form like a curb, which is connected with the front plate 61, the front frames 63, and the side frames 62. As mentioned above, a box structure is constructed, so that the rigidity of the front portion of the frame is improved by the simple construction.

The attachment plates 75 and 76 to which the front axle is attached also serve as an oscillation stopper (lateral rolling stopper) of the front axle, which restricts the rolling amount of the front axle by touching the front axle. Accordingly, the number of members in the vicinity of the front axle is reduced.

The upper portion of the front frame 63 works as a part of the mast supporting the loader 2. The lower portion of the front frame 63 works as a support member for the front axle. Thus, the front frame 63 works as a mast support member and a front axle support member, so that the stress is dispersed and the load capacity performance is improved.

The mast member 64 and the front axle are connected by the front frame 63, so that the load given to the mast member 64 can be directly transmitted to the front axle, and the frame of the working vehicle can be rarely strained.

As shown in FIG. 7, the front frame 63 and the side frame 62 are cross-jointed. The front frame 63 and the side frame 62 are jointed in a lateral T shape or the like, and the side frame 62 is connected to the inner side of the front frame 63. At a substantially center part of one of the frames 62 and 63 (in this embodiment, a portion the side frame 62 overlapping the front frame 63), holes 62c and 62d are provided, and the side frame 62 is welded at the inner margins of the holes 62c and 62d with the front frame 63. Namely, the front frame 63 and the side frame 62 overlapping each other are plug-welded. Thus, the front frame 63 and the side frame 62 are easily connected and the increase of the width caused by the connection can be prevented.

The front frame 63 and the side frame 62 are joined by the plug welding, so that the hole used for the welding can be used as a piping. As shown in FIG. 8, the front frame 63 has a hole 63c through which an exhaust pipe 12b connected to a silencer 12 is extended outside of the frame. As shown in FIG. 9, the hole 62c of the side frame 62 coincides to the hole 63c of the front frame 63, so that a hole communicating inside and outside of the frame is provided. At the front portion of the working vehicle 1, the bonnet 30 is provided on the frame 9. The bonnet 30 is hollow and made of resin. The bonnet 30 covers the engine provided on the frame 9. In the bonnet 30, the engine and the engine accessories such as a radiator, the silencer 12, an air cleaner 34 and so on are provided. The bonnet 30 is constructed to enable opening and closing with respect to the frame 9, whereby the bonnet is opened by rotating the front portion of the bonnet 30 upward. Seals 32 and 33 fitted on the rib 65 are provided between the bonnet 30 and the frame 9. At the front portion of the working vehicle 1, a cover 36 is provided, thereby covering the notch of the front plate 61.

The hole 63c is provided in the front frame 63 disposed at the left side of the vehicle. The position of the hole 63c coincides to the hole 62c of the side frame 62. The margins edges of the holes 62c and 63c are welded by plug welding, whereby the side frame 62 and the front frame 63 are jointed. Through the hole 63c, the exhaust pipe 12b connected to the silencer 12 is extended, whereby the exhaust gas can be exhausted outside the bonnet 30. Therefore, a space for piping without interference with the frame 9 is ensured in the plug-welded portion of the frame 9.

Reinforcement structure of the frame at the center part of the vehicle will be described below.

Figure 12:
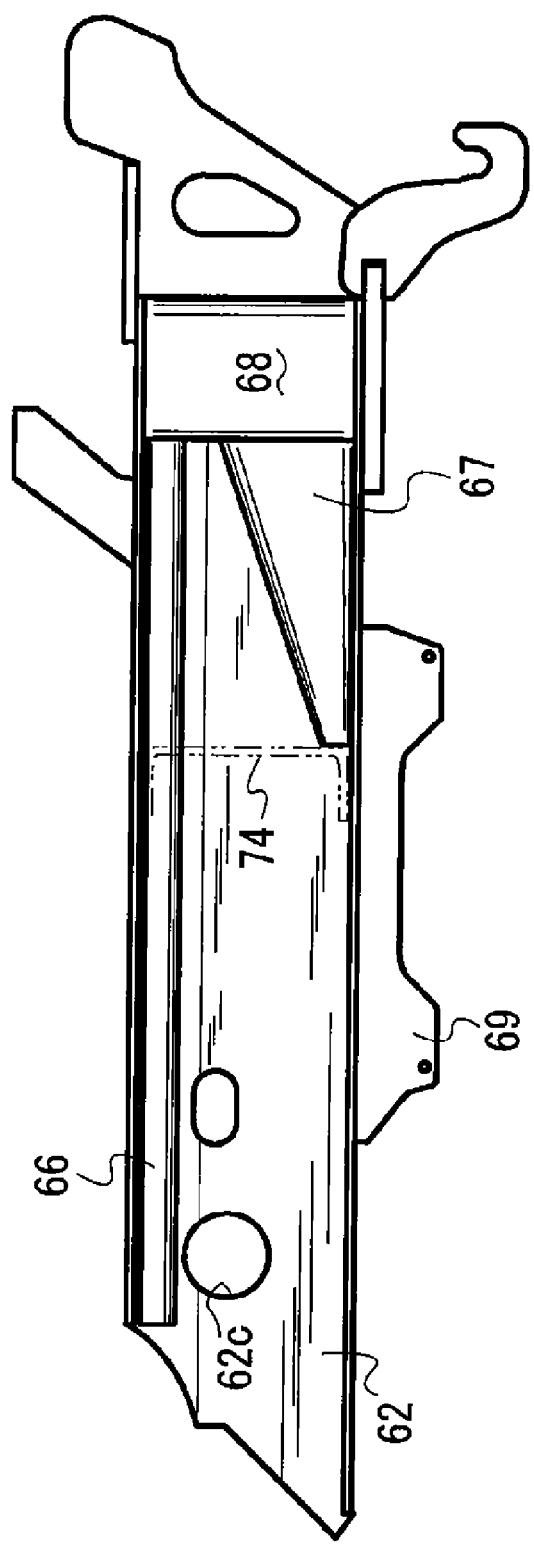
FIG. 12 is a side view of the side frame.

FIG. 12 is a side view of the side frame.

Figure 13:
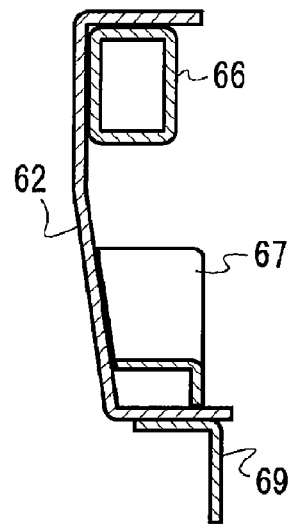
FIG. 13 is a sectional view taken on line B-B in FIG. 12.

FIG. 13 is a sectional view taken on line B-B in FIG. 12.

Figure 14:
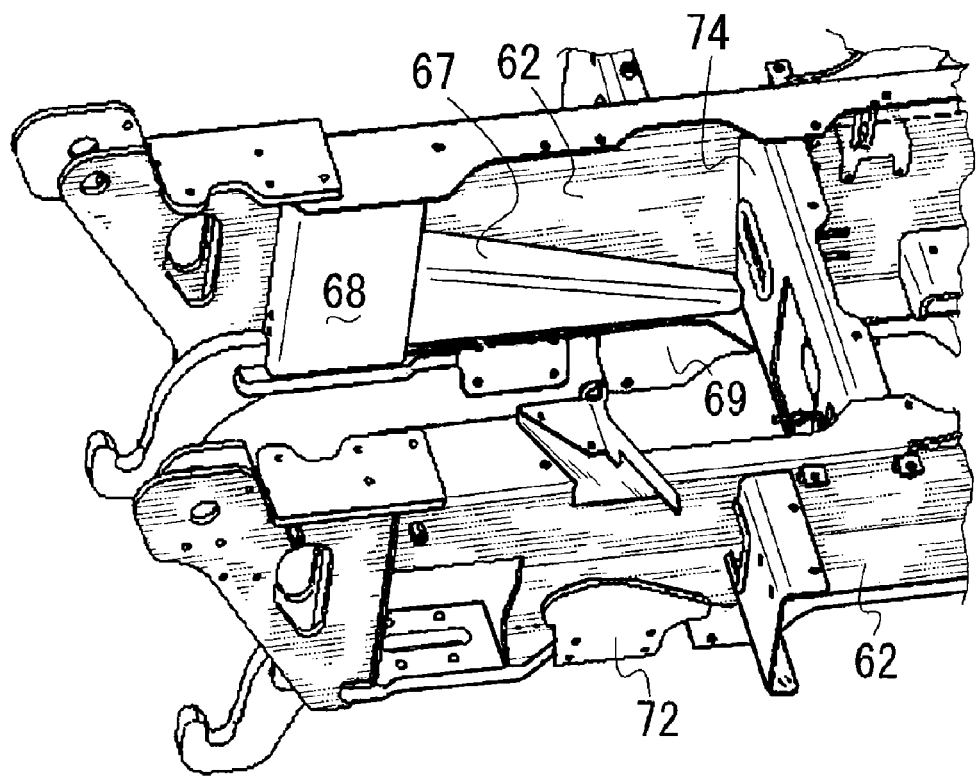
FIG. 14 is a perspective view of rear structure of the frame.

FIG. 14 is a perspective view of rear structure of the frame.

The side frame 62 is formed in narrow C shape seen from front. The side frames 62 are provided thereon with reinforcement members, including pipes 66, rear reinforcement members 68 and triangle reinforcement members 67, respectively. Each of the side frame 62 is provided on an upper portion thereof with the pipe 66, at a rear portion thereof with the rear reinforcement member 68, and at a rear lower portion thereof with the triangle reinforcement member 67. On the lower face of center part of the side frame 62, a lower reinforcement member 69 is attached and extended in the extended direction of the side frame 62.

Onto the upper portion of the side frame 62, the pipe 66 is attached. The pipe 66 has a square shape in sectional view, and it is extended from the engine arrangement part to the transmission attachment part. The pipe 66 is attached to the inner face of the return part in the upper part of the side frame 62, and is extended on the side frame 62 from the front end of the upper portion of the side frame 62 to the rear reinforcement member 68. The pipe 66 penetrates the partition 74 provided at the center part of the side frame 62. Thus, the part of the chassis frame of the working vehicle receiving a lot of stress can be effectively reinforced, which is reinforced by the angle pipes, so that the long-range attachment can be easily achieved.

On the rear portion of the side frame 62, the rear reinforcement member 68 is provided, and the rear axle is fixed below the rear reinforcement member 68. The side frame 62 has an opening at the portion thereof onto which the rear reinforcement member 68 is provided, whereby the rear axle is attachable through the opening from the outside of the side frame 62.

The triangle reinforcement member 67 is provided between the rear reinforcement member 68 and the partition 74, and the triangle reinforcement member 67 is connected with the rear reinforcement member 68 and the partition 74. The triangle reinforcement member 67 is formed in the inverse L shape in the sectional view. The triangle reinforcement member 67 is connected with the lower bent part and the inner face of the side frame 62, and the opening side of the member 67 is turned to the side frame 62.

The part of the side frame 62 attached to the triangle reinforcement 67 is formed in a square shape in the sectional view. Thus, the reaction of the side frame 62 against the driving force or the rigidity of the part loaded by the hitch is improved. The part to which a lot of stresses are given in the chassis frame of the working vehicle can be effectively reinforced.

The lower reinforcement member 69 is formed in the inverse L shape in the front view, and has a lower extended part into the inside of the vehicle (the opening side of the side frame 62). The lower reinforcement member 69 is extended in the working vehicle from the engine arrangement part to the transmission attachment part. The lower reinforcement member 69 is attached to the lower face of the side frame 62, whereby the part to which a lot of stresses are given can be effectively reinforced, and the frame that is easily assembled and has high rigidity is achieved.

The attachment structure for attaching a transmission to the frame 9 will be described below.

Figure 15:
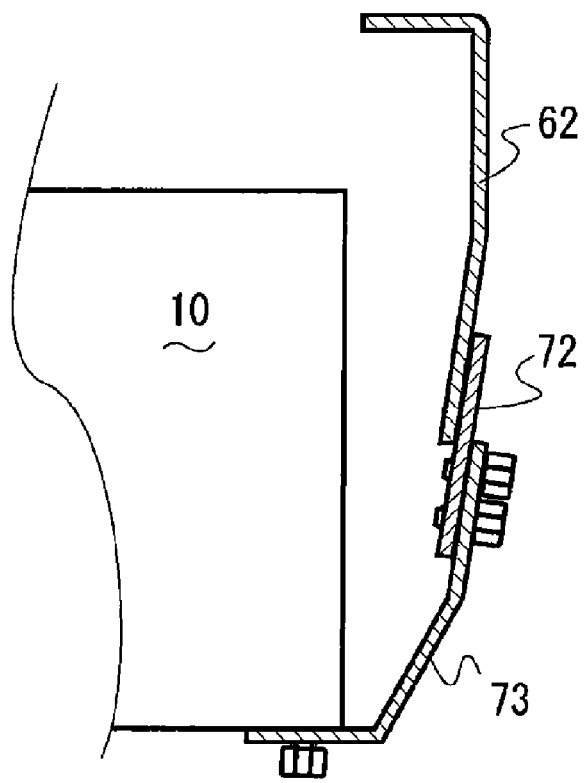
FIG. 15 is a schematic view of an attachment structure for attaching a transmission to the frame.

FIG. 15 is a schematic view of an attachment structure for attaching a transmission to the frame.

Figure 16:
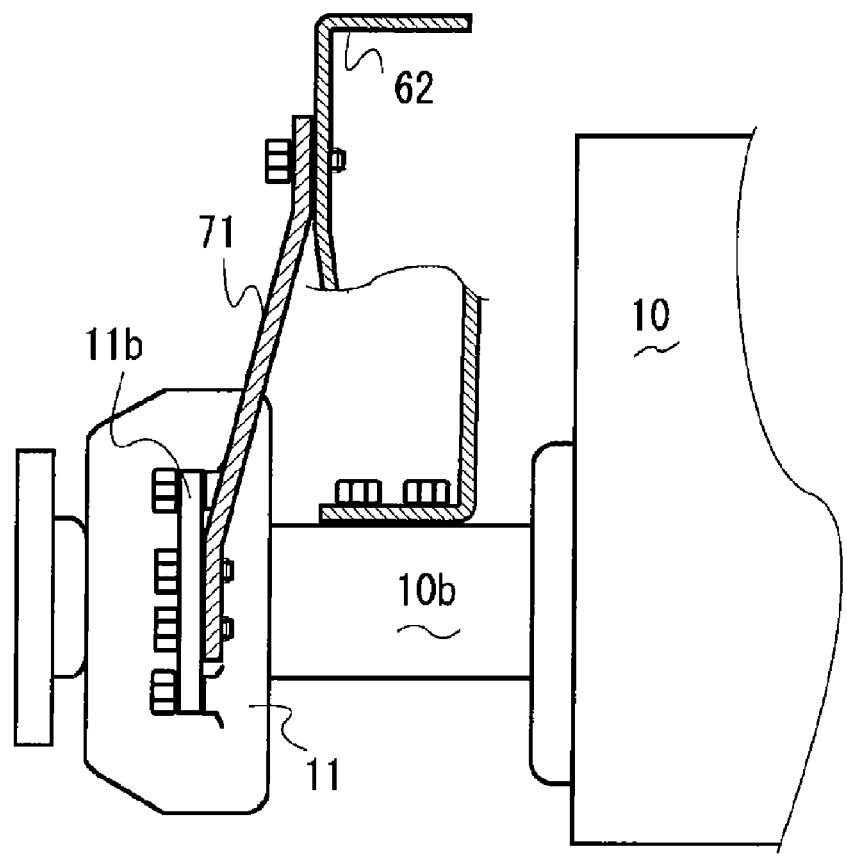
FIG. 16 is a schematic view of an attachment structure of a rear axle.

FIG. 16 is a schematic view of an attachment structure of a rear axle.

A transmission 10 is attached through a stay 73 of a rear extended part 72 fixed at the rear portion of the side frame 62. The transmission 10 is fixed at a lower or side face, thereof not only by the rear axle, but also by the stay 73 extended from the side frame 62 and foamed in the L shape in the front view. In the embodiment shown in FIG. 15, the lower end of stay 73 is connected to the lower face of the transmission 10. As mentioned above, the transmission 10 is fixed to the side frame 62 through the stay 73, so that the variation of transmissions attachable to the frame is expanded and the frame can be standardized. The stay 73 can receive a part of the force given by the transmission 10 by the deformation or the like. When the transmission 10 gives the excess load, the stay 73 is deformed plastically so as to protect the side frame 62.

The transmission 10 and each of the rear axle cases, constituting a transfer path of the driving force, are arranged in a gate shape in the top view, as shown in FIG. 16. In the transfer path, a driving case 10b extended in the lateral direction is connected at an outer side end thereof to the front portion of the rear axle case 11 connected with the shaft of the rear wheel 7, and is connected at an inner side end thereof to the transmission 10, so as to constitute the gate-shaped arrangement in the top view. The gate-shaped arrangements are laterally symmetrically provided in the vehicle 1. The rear axle case 11 is a terminal of the change gear mechanism, and the rear axle case 11 is connected to the side frame 62 through a stay 71. The stay 71 is fixed at an upper end thereof to the outside of the side frame 62, and is fixed at a lower end thereof to the rear portion of the rear axle case 11. The rear axle case 11 is supported as mentioned above, so that the stay 71 can absorb a part of the force generated from the rear axle case 11 by the deformation or the like. When the rear axle case 11 gives excessive load, the stay 71 is deformed plastically so as to protect the side frame 62. The supporting rigidity of the rear axle case 11 is changeable by the characteristic of material of the stay 71.

The structure of the mast 64 will be described below.

Figure 17:
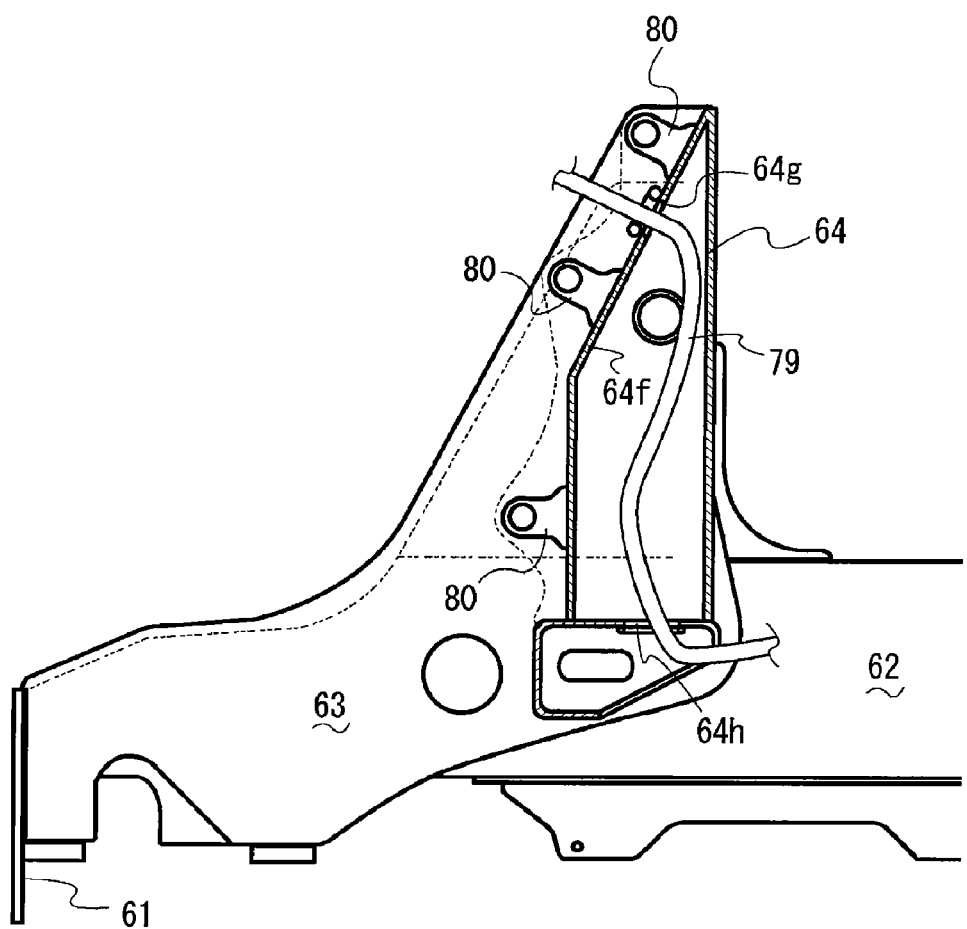
FIG. 17 is a side view partly in section of an inner structure of a mast member.

FIG. 17 is a side view partly in section of an inner structure of the mast member 64.

The mast member 64 is formed in the L shape in the top view and is connected to the outside of the front frame 63 and the upper face of the lower portion 64b. A partition 64f is provided between the mast member 64 and the front frame 63. The partition 64f constructs a space inward from the mast member 64, whereby the rigidity of the mast member 64 is improved. A piping 79 is provided in the space.

Bosses 80 are provided on the inside of the mast member 64, and bosses 80 are provided on the outside of the front frame 63 so as to correspond to the respective bosses 80, whereby the lift units of the loader 2 are twin-supported. The partition 64f is attached along the bosses 80, thereby improving the rigidity of the bosses 80. At the upper portion of the partition 64f, an opening 64g is provided at an upper portion of the partition 64f, and an opening 64h is provided at an upper face of the lower mast portion 64b. The piping through the space between the partition 64f and the mast member 64 is extended outward from the opening 64g and the opening 64h. The partition 64f is provided between the twin-supporting mast structures, the piping 79 is inserted from the lower face into the backside of the partition 64f, and is passed out through the opening 64g provided at the front face of the partition 64f. As a result, the piping 79 is protected by effectively use of the space around the mast member 64, and the working vehicle can be miniaturized.

The reinforcement structure of the boss 80 will be described below.

Figure 18:
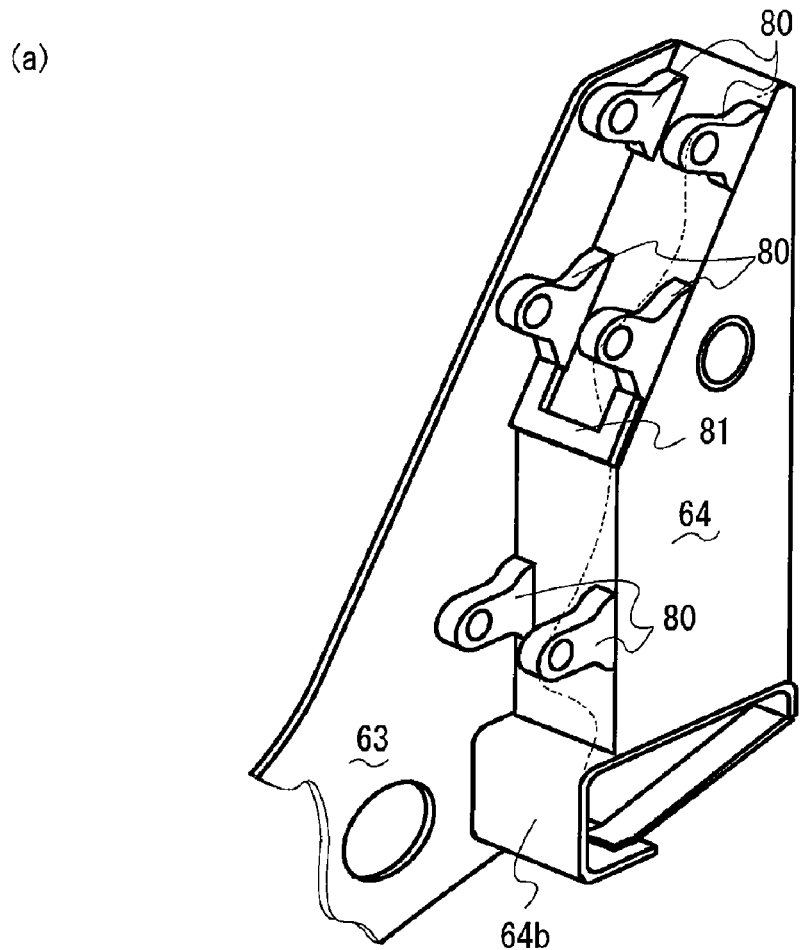
FIG. 18 is a view of a reinforcement structure of a boss.
Figure 18:
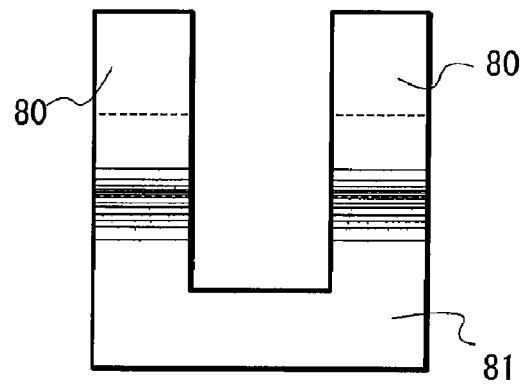

FIG. 18 is a view of a reinforcement structure of the boss. FIG. 18(a) is a perspective view of a reinforcement structure of the boss. FIG. 18(b) is a front view of a reinforcement structure of the boss.

The bosses 80 are gently convex, and are connected at their base portions to a reinforcement member 81. The reinforcement member 81 connecting the base parts of the bosses 80 is formed in the U shape in the front view. The bosses 80 and the reinforcement member 81 are connected by welding, so that the bosses 80 and the reinforcement member 81 are constructed integrally. It can be also available that the bosses 80 and the reinforcement member 81 are formed integrally in advance.

The reinforcement member 81 is attached to the front face of the partition 64f in the mast member 64 and is connected to the left and right bosses 80. The reinforcement member 81 can be attached to other bosses 80 above and below the bosses 80 provided at the vertical center part.

The bosses 80 are connected with the reinforcement member as mentioned above, so that the bosses 80 and the mast member 64 are easily reinforced.

A tank structure provided in a working vehicle will be described below.

Figure 19:
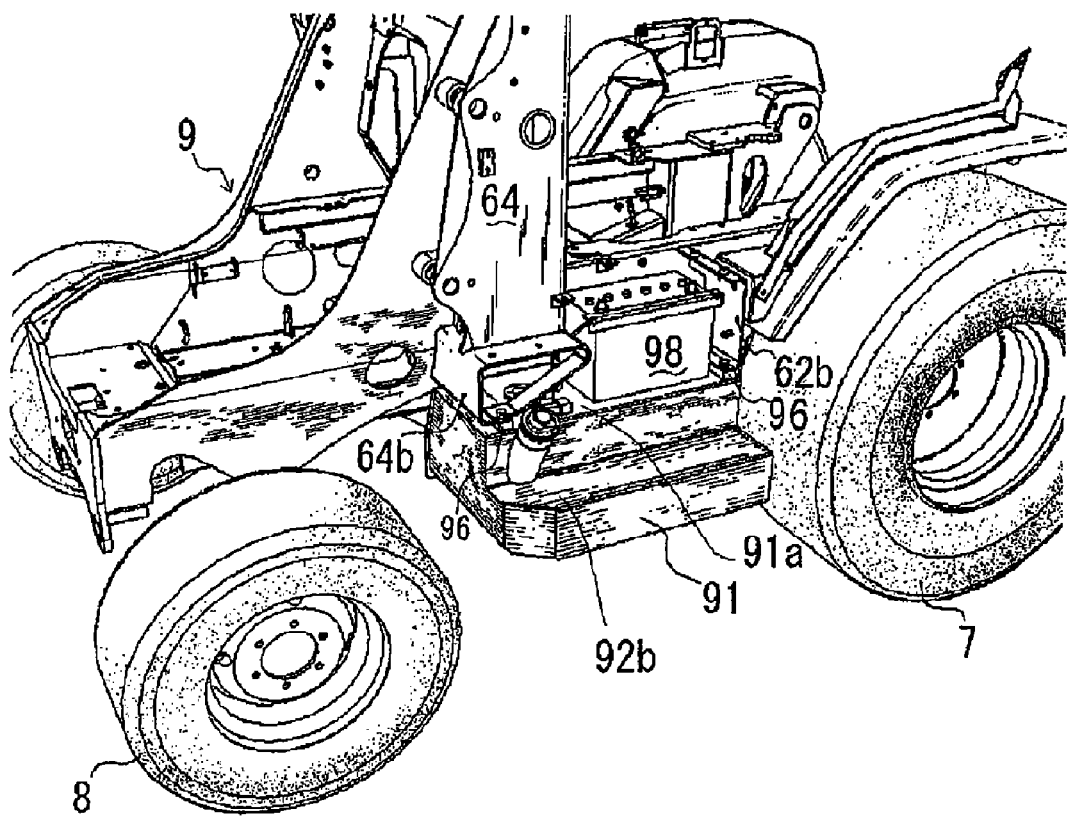
FIG. 19 is a perspective view of an attachment structure of a tank.

FIG. 19 is a perspective view of an attachment structure of tanks.

Figure 20:
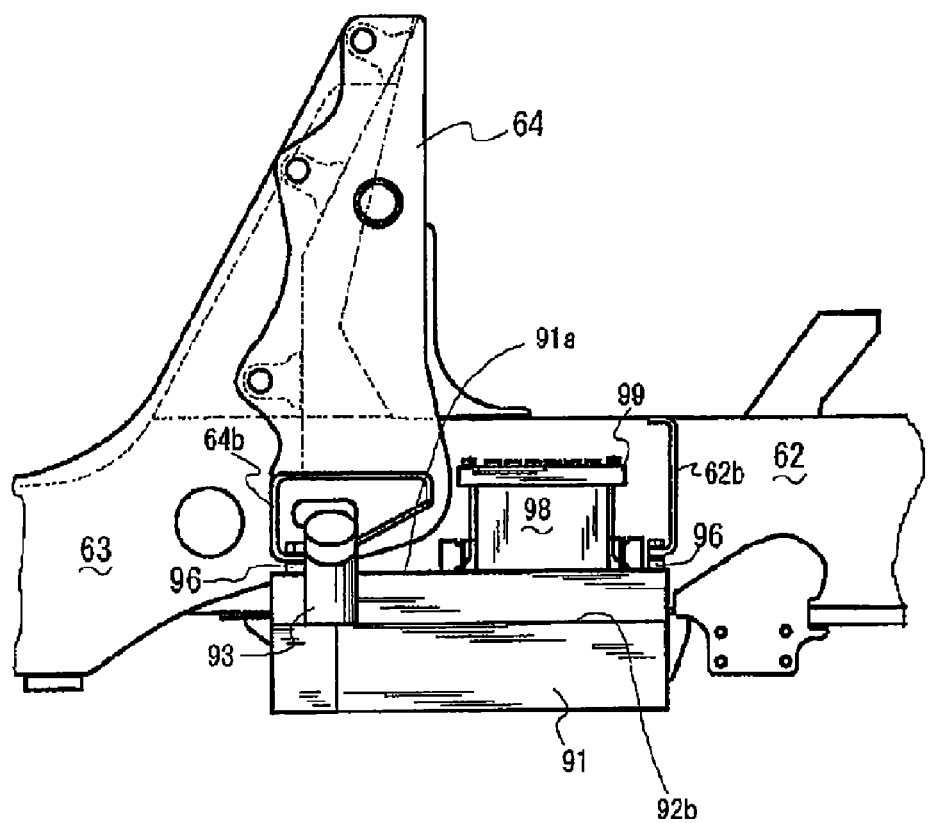
FIG. 20 is a side view of the attachment structure of the tank.

FIG. 20 is a side view of the attachment structure of the tanks.

At the sides of the operation part 4 in the working vehicle 1, the hydraulic oil tank 90 and the fuel tank 91 are provided respectively. Some projection members are extended sideward from the frame 9 so as to hang the hydraulic oil tank 90 and the fuel tank 91. In this embodiment, the lower mast portions 64b and the beams 62b serve as the projection members. The hydraulic oil tank 90 and the fuel tank 91 are provided below them.

Both the lower mast portion 64b and the beam 62b are extended sideward from each of the side frames 62 as components of the frame 9. The lower mast portion 64b is connected with the side frame 62 and the mast member 64, thereby contributing for the improvement of the rigidity of the mast member 64.

On an upper face of each of the hydraulic oil tank 90 and the fuel tank 91, two connection members 96 each of which has a tapped hole are provided. A bolt is screwed into the connection section of each of the tanks through the bottom faces of the lower portion 64b and of the beam 62b. Thus, each of the tanks is fastened on the bottom faces of the lower portion 64b and of the beam 62b. The connection members 96 are extended in the lateral direction on the upper faces of each of the hydraulic oil tank 90 and the fuel tank 91. Each of the connection members is provided with plural bolts to be screwed. As mentioned above, the connection members 96 are extended in the lateral direction on the upper face of each of the tanks, so that high rigidity and the durability against getting on and off of an operator are ensured even if each of the tanks is loaded on the outside thereof.

In this embodiment, the hydraulic tank 90 is provided at the right side of the frame 9, and the fuel tank 91 is provided at the left side of the frame 9. Each of the hydraulic tank 90 and the fuel tank 91 is formed in the step shape (L shape) in the front view, so as to have the lower part thereof more extended sideward (to the outside of the vehicle) than the vertical extension of the upper part thereof. Thus, even if the height of the tank is small, the tank has enough capacity, and the hydraulic tank 90 and the fuel tank 91 are miniaturized around the operation part 4.

Furthermore, the step-shaped face can be used as the steps to get on and off the operation part 4. At each of the corners of the hydraulic tank 90 and the fuel tank 91, an anti-slip member 94 is provided, whereby the safety when getting on and off is secured.

At the fuel tank 91, an upwardly inclined inlet 93 is protruded toward outside. The inlet 93 is provided between the upper part 91a and the lower part 92b of the fuel tank 91 and at an angled corner part formed at the outside of the fuel tank 91. A battery 98 is provided at the upper face of the fuel tank 91. The battery 98 is provided between the lower mast portion 64b and the beam 62b.

The hydraulic tank 90 and the fuel tank 91 are provided as mentioned above, so that they can be used as steps for getting on and off the operation part 4. When getting on and off, either the hydraulic tank 90 or the fuel tank 91 is stepped on and causes a sound, so that the change of an amount of the hydraulic oil or the fuel are known by means of hearing the sound.

The battery 98 can be provided in the clearance of the frame 9, whereby the space around the frame 9 can be effectively used.

Additionally, the battery 98 provided on the fuel tank 91 is covered by the cover installed in the working vehicle 1, and is protected from rainwater or earth and sand.

INDUSTRIAL APPLICABILITY

The present invention is applicable to a frame structure for working vehicle. Especially, it is applicable to a frame structure for a working vehicle that needs light weight and high rigidity.

The invention claimed is:

1. A frame structure for a working vehicle comprising:
   a pair of right and left side frames disposed parallel to each other, wherein the right and left side frames have an opened space between bottoms thereof, and wherein the right and left side frames are bent at respective vertically intermediate portions thereof so as to have respective upper portions extended vertically upward from the respective vertically intermediate portions to respective tops thereof, and to have respective lower portions extended slantwise from the respective vertically intermediate portions to the bottoms downward and laterally inward toward each other, whereby a distance between the bottoms of the right and left side frames is narrower than a distance between the tops of the right and left side frames so that the right and left side frames have a boat-like shape in a front view;
   a pair of right and left front frames disposed parallel to each other, wherein each of the right and left front frames is integrally formed to comprise:
      a frame-connection portion, wherein the frame-connection portions of the respective right and left front frames are overlapped with front portions of the respective right and left side frames in a side view and are attached at respective insides thereof to the respective front portions of the right and left side frames;
      an axle-supporting portion extended forward and downward from the frame-connection portion; and
      a mast portion extended upward from the frame-connection portion, wherein the mast portions of the right and left front frames are connected to each other so as to serve as part of a mast for supporting a front loader; and
   a front plate extended between front edges of the right and left front frames so as to connect the right and left front frames to each other.

2. A frame structure for a working vehicle according to claim 1, further comprising:
   a pair of right and left mast plate members fixed to the mast portions of the respective right and left front frames so that the connected mast portions of the right and left front frames and the right and left mast plate members serve as the mast for supporting the front loader, and wherein the right and left mast plate members are fixed at respective lower portions thereof to the frame-connection portions of the respective right and left front frames overlapping the respective right and left side frames.

3. A frame structure for a working vehicle according to claim 1, wherein a partition plate, having an opening, is interposed between each of the mast portions of the respective right and left front frames and each of the mast plate members so as to enclose a space with the mast portion of the front frame and the mast plate member, and wherein a piping for a working machine is passed through the opening of the partition plate into the space.

4. A frame structure for a working vehicle according to claim 1, further comprising:
- a front plate extended between front edges of the right and left front frames so as to connect the right and left front frames to each other;
- a pair of right and left longitudinal plates, wherein the right and left longitudinal plates are disposed between the axle-supporting portions of the right and left front frames, are extended longitudinally of the working vehicle in parallel to each other, and are connected to the front portions of the respective right and left side frames, and to the front plate; and
- a pair of front and rear lateral plates to which a front axle is attached, wherein the front and rear lateral plates are extended laterally of the working vehicle in parallel to each other, wherein the rear lateral plate is extended across the right and left longitudinal plates, and is connected to bottoms of the axle-supporting portions of the right and left front frames at right and left ends thereof, and to the right and left longitudinal plates between the right and left ends thereof, and wherein the front lateral plate is extended along the front plate, and is connected to bottoms of the axle-supporting portions of the right and left longitudinal plates at right and left ends thereof, and to the front plate, so that the right and left longitudinal plates and the front and rear lateral plates are arranged in a curb-shape in a bottom view so as to constitute a box-shaped structure for supporting the front axle.

5. A frame structure for a working vehicle according to claim 1, wherein the right and left side frames further integrally form respective rear portions extended rearward from the respective mast portions of the right and left front frames so that the side and front frames appear as a reversed T-shape in a side view.

* * * * *